(12) United States Patent
Keiser et al.

(10) Patent No.: US 12,306,904 B2
(45) Date of Patent: May 20, 2025

(54) ENHANCED DATA COMPRESSION

(71) Applicant: Ford Global Technologies, LLC, Dearborn, MI (US)

(72) Inventors: Lynn Valerie Keiser, Sunnyvale, CA (US); Dominique Meroux, Fair Oaks, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 842 days.

(21) Appl. No.: 17/233,992

(22) Filed: Apr. 19, 2021

(65) Prior Publication Data

US 2022/0335105 A1 Oct. 20, 2022

(51) Int. Cl.
*G06F 17/17* (2006.01)
*B60W 10/06* (2006.01)
*G06F 17/15* (2006.01)

(52) U.S. Cl.
CPC ........... *G06F 17/175* (2013.01); *B60W 10/06* (2013.01); *G06F 17/153* (2013.01); *B60W 2556/10* (2020.02)

(58) Field of Classification Search
CPC ...... G06F 17/175; G06F 18/10; G06F 17/153; B60W 10/06; B60W 2556/10
See application file for complete search history.

(56) References Cited

U.S. PATENT DOCUMENTS

| | | | |
|---|---|---|---|
| 7,302,106 B2 | 11/2007 | Liu et al. | |
| 9,996,617 B2 | 6/2018 | Hassan et al. | |
| 2015/0142990 A1* | 5/2015 | Adachi | G01C 21/3492 709/247 |
| 2016/0226513 A1* | 8/2016 | Liaghati | H03M 7/42 |
| 2020/0285983 A1 | 9/2020 | Bhattacharyya | |
| 2021/0092018 A1* | 3/2021 | Fang | G07C 5/008 |
| 2022/0345731 A1* | 10/2022 | Sugio | G06T 17/00 |

FOREIGN PATENT DOCUMENTS

| | | | | |
|---|---|---|---|---|
| DE | 102006005844 A1 * | 8/2006 | ......... | B60C 23/0408 |
| WO | WO-2010088465 A1 * | 8/2010 | ......... | H04N 21/4318 |

OTHER PUBLICATIONS

Machine Translation of DE102006005844A1 PDF File Name: "DE102006005844A1_Machine_Translation.pdf".*
Machine Translation of WO2010088465A1 PDF File Name: "WO2010088465A1_Machine_Translation.pdf".*
Xing, R. "The Compression of IoT operational data time series in vehicle embedded systems," KTH Royal Institute of Technology, School of Electrical Engineering and Computer Science (EECS), Department of Communication Systems, Stockholm, Sweden, Nov. 12, 2018, 95 pages.

* cited by examiner

*Primary Examiner* — Grant Moubry
*Assistant Examiner* — Ruben Picon-Feliciano
(74) *Attorney, Agent, or Firm* — Christopher Storms; Brooks Kushman P.C.

(57) ABSTRACT

A plurality of sets of sample data points from a vehicle sensor are determined, each set including a predetermined number of consecutive sample data points. Respective differences between pairs of consecutive sample data points in each set are determined. The differences are stored in respective subspaces of one of a plurality of memory spaces of the memory, each memory space in the plurality of memory spaces storing differences of one and only one of the plurality of sets of sample data points. The collected data are restored based on the stored differences in the plurality of memory spaces. A vehicle component is actuated based on the restored data.

20 Claims, 5 Drawing Sheets

| Sample 1 | SD0102 | SD0304 | SD0506 | SD0708 | SD0910 |
|---|---|---|---|---|---|
| | SD0203 | SD0405 | SD0607 | SD0809 | SD1011 |

| SD1112 | SD1314 | SD1516 | SD1718 | SD1920 | SD2122 |
|---|---|---|---|---|---|
| SD1213 | SD1415 | SD1617 | SD1819 | SD2021 | Scale Factor |

FIG. 4

ENHANCED DATA COMPRESSION

BACKGROUND

Vehicles can be equipped with computing devices, networks, sensors, and controllers to acquire data regarding vehicle component operation and the vehicle's environment. The computing devices can operate the vehicle based on the data. Vehicle sensors can provide data concerning, e.g., an engine speed, a brake pressure, a steering wheel angle, etc. Operation of the vehicle and analysis of vehicle operation can rely upon voluminous component data collected while the vehicle is being operated on a roadway. Vehicles may store the collected data in memories of the computing devices.

BRIEF DESCRIPTION OF THE DRAWINGS

FIG. 4 is a block diagram of an example memory space in the vehicle.

DETAILED DESCRIPTION

Figure 1:
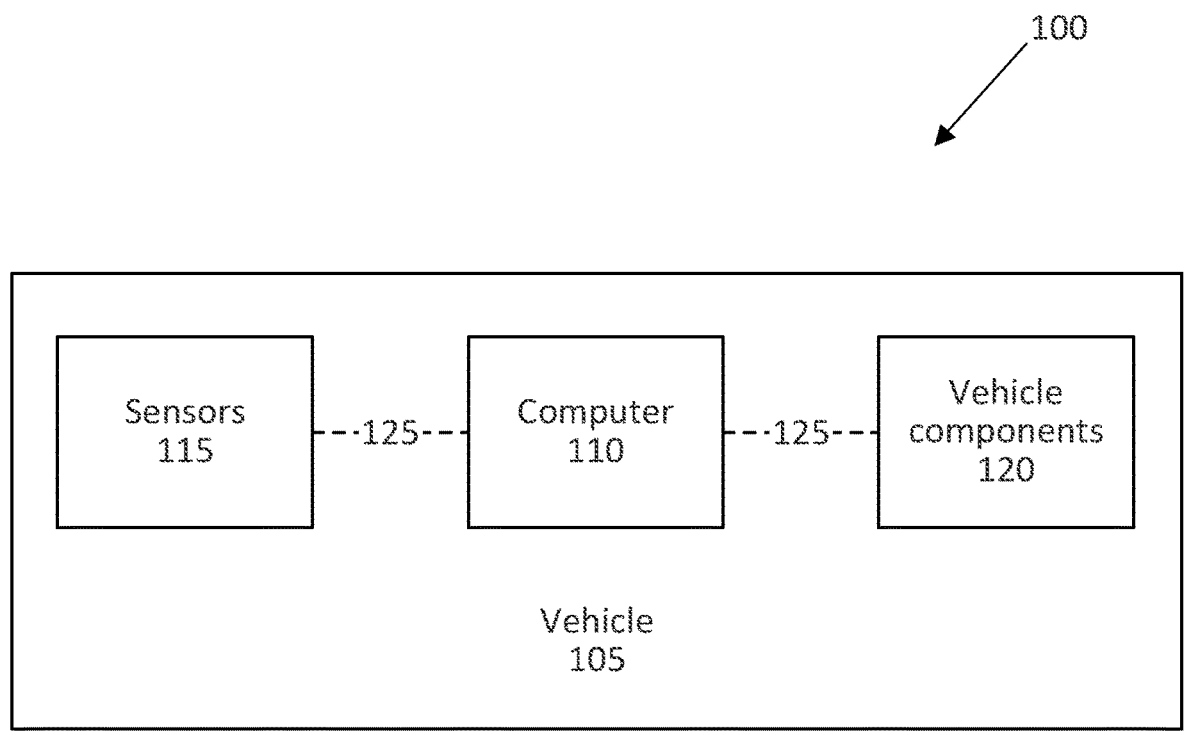
FIG. 1 is a block diagram of an example system for compressing and restoring data collected in a vehicle.

A system includes a computer including a processor and a memory, the memory storing instructions executable by the processor to determine a plurality of sets of sample data points collected from a vehicle sensor, each set including a predetermined number of consecutive sample data points, determine respective differences between pairs of consecutive sample data points in each set, store the differences in respective subspaces of one of a plurality of memory spaces of the memory, each memory space in the plurality of memory spaces storing differences of one and only one of the plurality of sets of sample data points, restore the collected data based on the stored differences in the plurality of memory spaces, and actuate a vehicle component based on the restored data.

The collected data can be engine speed data, and the instructions can further include instructions to actuate a vehicle propulsion based on restored engine speed data.

A memory size of each memory space can be smaller than a combined memory size of the set of sample data points associated to the respective memory space.

The memory space can be a plurality of 16-bit data blocks, and each 16-bit data block can include two of the differences stored as an 8-bit number.

The instructions can further include instructions to generate a polynomial interpolation based on the plurality of sample data points and to restore the collected data based on the polynomial interpolation and the stored differences.

The polynomial interpolation can be a cubic spline.

The instructions can further include instructions to actuate the vehicle component based on a restored data point between two consecutive sample data points, the restored data point based on the polynomial interpolation between the two consecutive sample data points.

The instructions can further include instructions to determine a respective slope between each pair of consecutive sample data points in each set and to restore the sample data points based on the determined slopes.

Each set of the sample data points can include sample data points within a specified period of time.

The instructions can further include instructions to, for each memory space, determine a scaling factor to convert each determined difference from a floating point number to an integer and to store the scaling factor as a segment in the memory space.

The scaling factor can be based on a magnitude of one of the differences in the memory space.

The instructions to restore the sample data points can further include instructions to divide each difference in the memory space by the scaling factor.

The memory space can include a first sample data point of the set of sample data points associated to the memory space, and the instructions to restore the collected data can include instructions to sum the first sample data point with at least one of the stored differences.

A method includes determining a plurality of sets of sample data points collected from a vehicle sensor, each set including a predetermined number of consecutive sample data points, determining respective differences between pairs of consecutive sample data points in each set, storing the differences in respective subspaces of one of a plurality of memory spaces of the memory, each memory space in the plurality of memory spaces storing differences of one and only one of the plurality of sets of sample data points, restoring the collected data based on the stored differences in the plurality of memory spaces, and actuating a vehicle component based on the restored data.

The collected data can be engine speed data, and the method can further include actuating a vehicle propulsion based on restored engine speed data.

The method can further include generating a polynomial interpolation based on the plurality of sample data points and restoring the collected data based on the polynomial interpolation and the stored differences.

The method can further include actuating the vehicle component based on a restored data point between two consecutive sample data points, the restored data point based on the polynomial interpolation between the two consecutive sample data points.

The method can further include determining a respective slope between each pair of consecutive sample data points in each set and restoring the sample data points based on the determined slopes.

The method can further include, for each memory space, determining a scaling factor to convert each determined difference from a floating point number to an integer and storing the scaling factor as a segment in the memory space.

The method can further include dividing each difference in the memory space by the scaling factor.

The memory space can include a first sample data point of the set of sample data points associated to the memory space, and the method can further include summing the first sample data point with at least one of the stored differences.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Continuously collected vehicle data, such as engine speed, can use space in a memory of a computer that could store other data. Transmitting these continuously collected data without compression over, e.g., a wireless network, can use bandwidth that otherwise could transmit other data and messages. Limited memory space and network bandwidth provide constraints for collecting large amounts of continuously collected data from one or more sensors and storing the raw data.

The foregoing technical obstacles can be addressed by a computer that can reduce the memory space used to store continuously collected vehicle data by selecting a subset of the raw data, generating a polynomial approximation to approximate values between the data points of the subset, and compressing the subset into smaller memory spaces that would otherwise be used for the raw data. The compression algorithm can reduce the amount of memory space used while maintaining precision of the raw data. For example, most of the data collected as 16-bit signed integers can be stored as signed 8-bit integer differences, reducing the amount of memory space used by nearly half while maintaining most of the precision of the raw 16-bit signed integers. In an example, 22 16-bit integers can be stored in a memory space with 12 16-bit subspaces by storing a first data point as a 16-bit integer, storing the 21 differences of consecutive ordered pairs 16-bit integers as 8-bit signed integers, and storing an 8-bit unsigned integer as a scaling factor to restore the 8-bit signed integer different to a 16-bit signed integers.

When the computer determines to use the stored data, the computer can retrieve the compressed data and use the polynomial approximation to restore the data. The restored data are an approximation of the raw data, and the polynomial approximation can be determined to minimize differences between the raw data and the restored data. For example, the polynomial approximation can be a cubic spline that approximates values between data points of the subset with a cubic polynomial. The cubic spline can output a smaller difference between the raw data and the restored data than, e.g., a linear interpolation between data points of the subset. By using the cubic spline, the computer can actuate components in a manner as if the computer used the raw data, reducing the amount of memory space used in the computer while outputting similar performance to using the raw data.

FIG. 1 illustrates an example system 100 for compressing and restoring data collected in a vehicle 105. A computer 110 in the vehicle 105 is programmed to receive collected data from one or more sensors 115. For example, vehicle 105 data may include a location of the vehicle 105, data about an environment around a vehicle, data about an object outside the vehicle such as another vehicle, etc. A vehicle 105 location is typically provided in a conventional form, e.g., geo-coordinates such as latitude and longitude coordinates obtained via a navigation system that uses the Global Positioning System (GPS). Further examples of data can include measurements of vehicle 105 systems and components, e.g., a vehicle 105 velocity, a vehicle 105 trajectory, etc.

The computer 110 is generally programmed for communications on a vehicle network 125, e.g., including a conventional vehicle 105 communications bus such as a CAN bus, LIN bus, etc., and or other wired and/or wireless technologies, e.g., Ethernet, WIFI, etc. Via the network, bus, and/or other wired or wireless mechanisms (e.g., a wired or wireless local area network in the vehicle 105), the computer 110 may transmit messages to various devices in a vehicle 105 and/or receive messages from the various devices, e.g., controllers, actuators, sensors, etc., including sensors 115. Alternatively or additionally, in cases where the computer 110 actually comprises multiple devices, the vehicle network may be used for communications between devices represented as the computer 110 in this disclosure. For example, the computer 110 can be a generic computer with a processor and memory as described above and/or may include a dedicated electronic circuit including an ASIC that is manufactured for a particular operation, e.g., an ASIC for processing sensor data and/or communicating the sensor data. In another example, computer 110 may include an FPGA (Field-Programmable Gate Array) which is an integrated circuit manufactured to be configurable by an occupant. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in computer 110. In addition, the computer 110 may be programmed for communicating with a network, which may include various wired and/or wireless networking technologies, e.g., cellular, Bluetooth®, Bluetooth® Low Energy (BLE), wired and/or wireless packet networks, etc.

The memory can be of any type, e.g., hard disk drives, solid state drives, servers, or any volatile or non-volatile media. The memory can store the collected data sent from the sensors 115. The memory can be a separate device from the computer 110, and the computer 110 can retrieve information stored by the memory via a network in the vehicle 105, e.g., over a CAN bus, a wireless network, etc. Alternatively or additionally, the memory can be part of the computer 110, e.g., as a memory of the computer 110.

Sensors 115 can include a variety of devices. For example, various controllers in a vehicle 105 may operate as sensors 115 to provide data via the vehicle network 125, e.g., data relating to vehicle speed, acceleration, location, subsystem and/or component status, etc. Further, other sensors 115 could include cameras, motion detectors, etc., i.e., sensors 115 to provide data for evaluating a position of a component, evaluating a slope of a roadway, etc. The sensors 115 could, without limitation, also include short range radar, long range radar, LIDAR, and/or ultrasonic transducers.

Collected data can include a variety of data collected in a vehicle 105. Examples of collected data are provided above, and moreover, data are generally collected using one or more sensors 115, and may additionally include data calculated therefrom in the computer 110, and/or at a server. In general, collected data may include any data that may be gathered by the sensors 115 and/or computed from such data.

The vehicle 105 can include a plurality of vehicle components 120. In this context, each vehicle component 120 includes one or more hardware components adapted to perform a mechanical function or operation—such as moving the vehicle 105, slowing or stopping the vehicle 105, steering the vehicle 105, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like. Components 120 can include computing devices, e.g., electronic control units (ECUs) or the like and/or computing devices such as described above with respect to the computer 110, and that likewise communicate via a vehicle 105 network.

The vehicle 105 includes a vehicle network 125. As described above, the vehicle network 125 can be, e.g., a CAN bus, LIN bus, etc., and/or other wired and/or wireless technologies, e.g., Ethernet, WIFI, etc. The computer 110 can communicate with the sensors 115 and the components 120 via the vehicle network 125. That is, the sensors 115 can provide data to the computer 110 via the vehicle network 125, and the computer 110 can provide instructions to the components 120 via the vehicle network 125.

Figure 2:
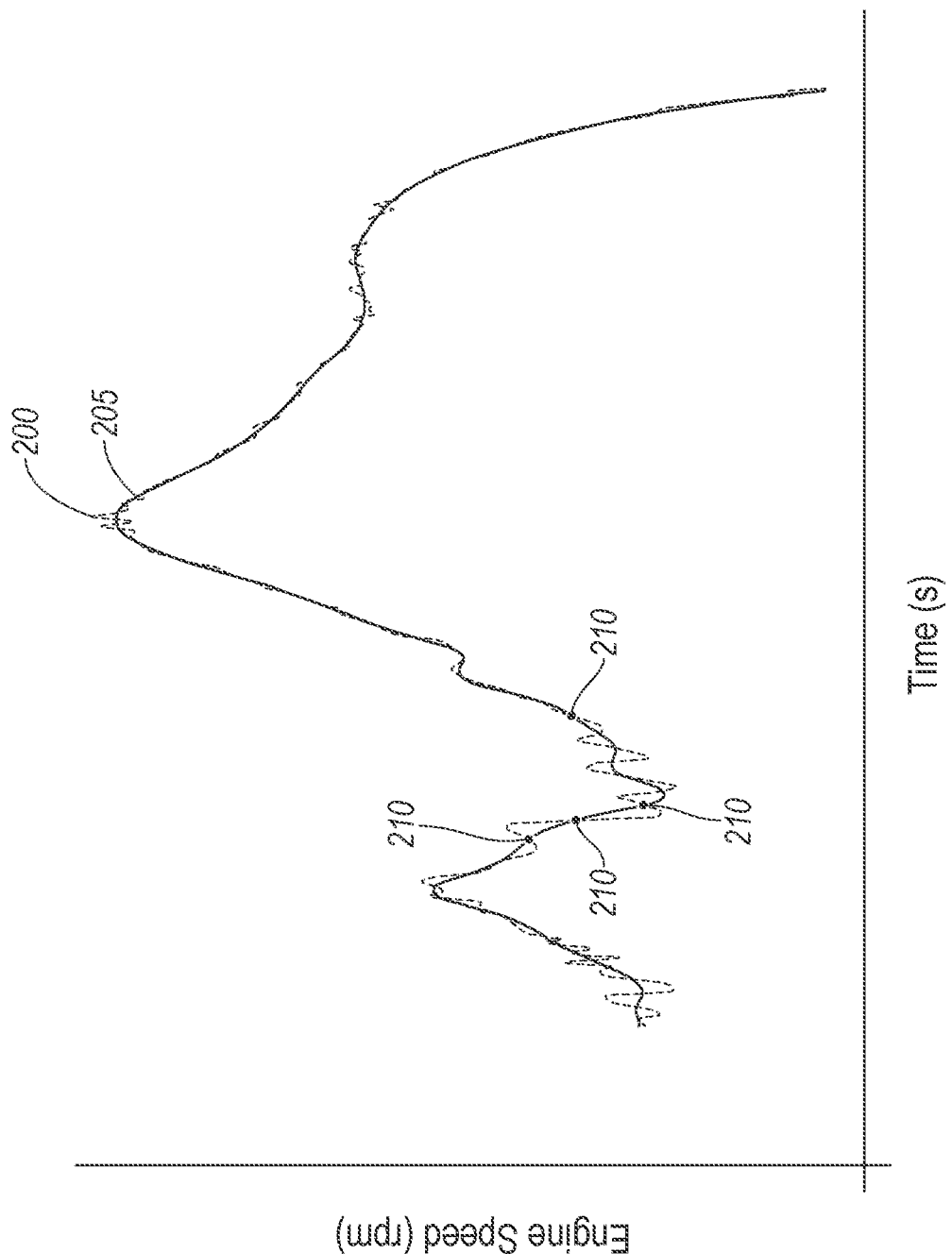
FIG. 2 is a diagram of example collected data.

FIG. 2 is a chart of data 200 collected by a sensor 115. The data 200 are engine speed data collected from a sensor 115 in communication with a propulsion. The data 200 are "raw" data, i.e., data collected directly from the sensor 115. FIG. 2 illustrate raw engine speed data 200 on the vertical axis plotted over a period of time along the horizontal axis. The raw data 200 can be stored in the memory of the computer 110. However, the computer 110 may have limited memory capacity, and storing the raw data 200 may use space that the computer 110 could use for other data. Thus, to store the raw data 200, the computer 110 can compress the raw data 200 to a form that uses less memory space than the raw data 200 would use, as described below.

To compress the raw data 200 for storage in the memory, the computer 110 can determine a polynomial approximation 205 of the raw data 200. The polynomial approximation 205 is an equation that approximates the raw data 200. The polynomial approximation 205 can be a Hermite cubic spline, i.e., a set of equations of the form $ax^3+bx^2+cx+d$, where a, b, c, d are real number coefficients and x is an input variable e.g., time. FIG. 2 illustrates the polynomial approximation 205 as a cubic spline 205. The cubic spline 205, being an equation, can be stored in a memory of the computer 110 with less memory space than the raw data 200 that the cubic spline 205 approximates. Thus, the computer 110 can determine not to store some of the raw data 200 and use the cubic spline 205 to determine an approximated data value, reducing the total amount of memory used by the raw data 200.

The computer 110 can identify sampled data 210 that are a subset of the raw data 200. The computer 110 can identify data points, i.e., items of sampled data 210 (i.e., an item of data means an individual datum, e.g., an individual value output from a sensor 115), as a set of the raw data 200 that are evenly spaced from each other. For example, the computer 110 can identify every $20^{th}$ item of raw data 200 as the sampled data 210. To determine the sampled data 210, the computer 110 can identify respective indexes of the raw data 200, i.e., integer values indicating an order in which the items of raw data 200 were collected, and the computer 110 can determine the sampled data 210 based on the indexes. For example, to identify every $20^{th}$ item of raw data 200, the computer 110 can identify each item of raw data 200 having an index evenly divisible by 20, i.e., congruent to 0 modulo 20 (e.g., indexes 20, 40, 60, 80, etc.). The computer 110 can store the sample data 210 in the memory, reducing the amount of memory space used by 95% when storing every $20^{th}$ data point.

The computer 110 can restore data approximating the raw data 200 with the polynomial approximation 205 and the sampled data 210. In this context, to "restore" data means to approximate the values of the raw data 200 with the polynomial approximation 205 and the sampled data 210, including reversing a compression technique to determine a sampled data point 210 that has been compressed for storage in a memory and to use the polynomial approximation 205 to approximate a item of raw data 200 between two sample data points 210. That is, the sampled data 210 include fewer data points than the raw data 200, and, to actuate components 120 based on data that were not stored in the sample data 210, the polynomial approximation 205 approximates the values between sample data 210. As described in more detail below, the polynomial approximation 205 can be a cubic spline that approximates values between sample data points 210 with a cubic polynomial.

The sampled data 210 can include items of raw data 200 that are not evenly spaced from each other. That is, in additional to the evenly-spaced sampled data 210, the computer 110 can collect specific items of raw data 200 that are of interest but would not be collected by the even sample collection described above. For example, upon determining the polynomial approximation 205, the computer 110 can determine respective differences between each item of raw data 200 and its polynomial approximation 205. The computer 110 can identify a subset of items of raw data 200 to include in the sampled data 210 based on the differences. For example, the computer 110 can identify a predetermined number of items of raw data 200 that have greater differences from their polynomial approximations 205 than other items of raw data 200. That is, the computer 110 can order the differences from greatest to least and identify a predetermined number of items of raw data 200 starting with the items of raw data 200 with the greatest difference from its respective polynomial approximation, then the next greatest difference, and continuing until the computer 110 has identified the predetermined number of items of raw data 200. For example, the computer 110 can identify the 100 items of raw data 200 that have the greatest respective differences from the polynomial approximation 205 among all of the items of raw data 200. By including additional items of raw data 200 based on differences from the polynomial approximation 205, the computer 110 can compress and restore data approximating the raw data 200 with the polynomial approximation 205 more accurately than without these items of raw data 200. That is, including the items of raw data 200 with the greatest differences from the polynomial approximation 205 allows the restoration of the data, as described below, to more accurately approximate the raw data 200 than using the evenly-spaced sampled data 210 alone.

The computer 110 can actuate one or more vehicle components 120 based on the polynomial approximation 205. For example, the computer 110 can approximate fuel consumption values between raw fuel consumption data 200 values with the polynomial approximation 205. The computer 110 can use the approximated fuel consumption values to determine a fuel consumption rate of a propulsion for a previously traveled trip and to predict a fuel consumption rate for a future trip, and can actuate at least one of a fuel injector, a spark plug, an exhaust gas recirculation subsystem, and/or throttle based on the predicted fuel consumption rate. That is, the polynomial approximation 205 more accurately characterizes operation of the vehicle 105 than the sampled data 210 alone characterizes the operation.

In another example, the computer 110 can upload the sampled data 210 and the polynomial approximation 205 to a server programmed with a machine learning program trained to adjust a drivetrain control program for the vehicle 105. The drivetrain control program can be programming of the computer 110 that actuates one or more components to control movement of the vehicle 105, e.g., the spark plug, the throttle, the fuel injector, etc. For example, the drivetrain control program can control one or more of fuel injection timing, fuel injection amount, turbo boost pressure, spark timing, valve timing, transmission shift operation, and/or other actions resulting from actuation of components 120. The machine learning program can adjust one or more parameters of the drivetrain control program based on input sampled engine speed data 210 and the polynomial approximation 205. The server can transmit the adjusted parameters to the computer 110, and the computer 110 can use the adjusted parameters with the drivetrain control program to, e.g., increase engine performance, increase engine efficiency, reduce engine emissions, and/or improve consistency and predictability of power output from the engine.

In another example, the computer 110 can collect engine speed data from a propulsion, compress the sampled data 210, and send the sampled data 210 and the polynomial approximation 205 via a network to a server that manages a fleet of vehicles 105. The server can, upon restoring the sampled data 210 with the polynomial approximation 205, predict a time to repair the propulsion of the vehicle 105 based on conventional wear models that output wear of a propulsion based on engine speed. Then, upon reaching the predicted time, the server can instruct the vehicle 105 to move to a repair location to repair the propulsion. By collecting compressed sampled data 210 from each of a plurality of vehicles 105, the server can manage operation of the fleet of vehicles 105. In yet another example, the fleet server can use electricity consumption sampled data 210 and polynomial approximations from a plurality of electric service vehicles 105 to assign service vehicles 105 to routes that minimize power consumption from batteries of the electric service vehicles 105, improving operation efficiency of the vehicles 105.

Figure 3:
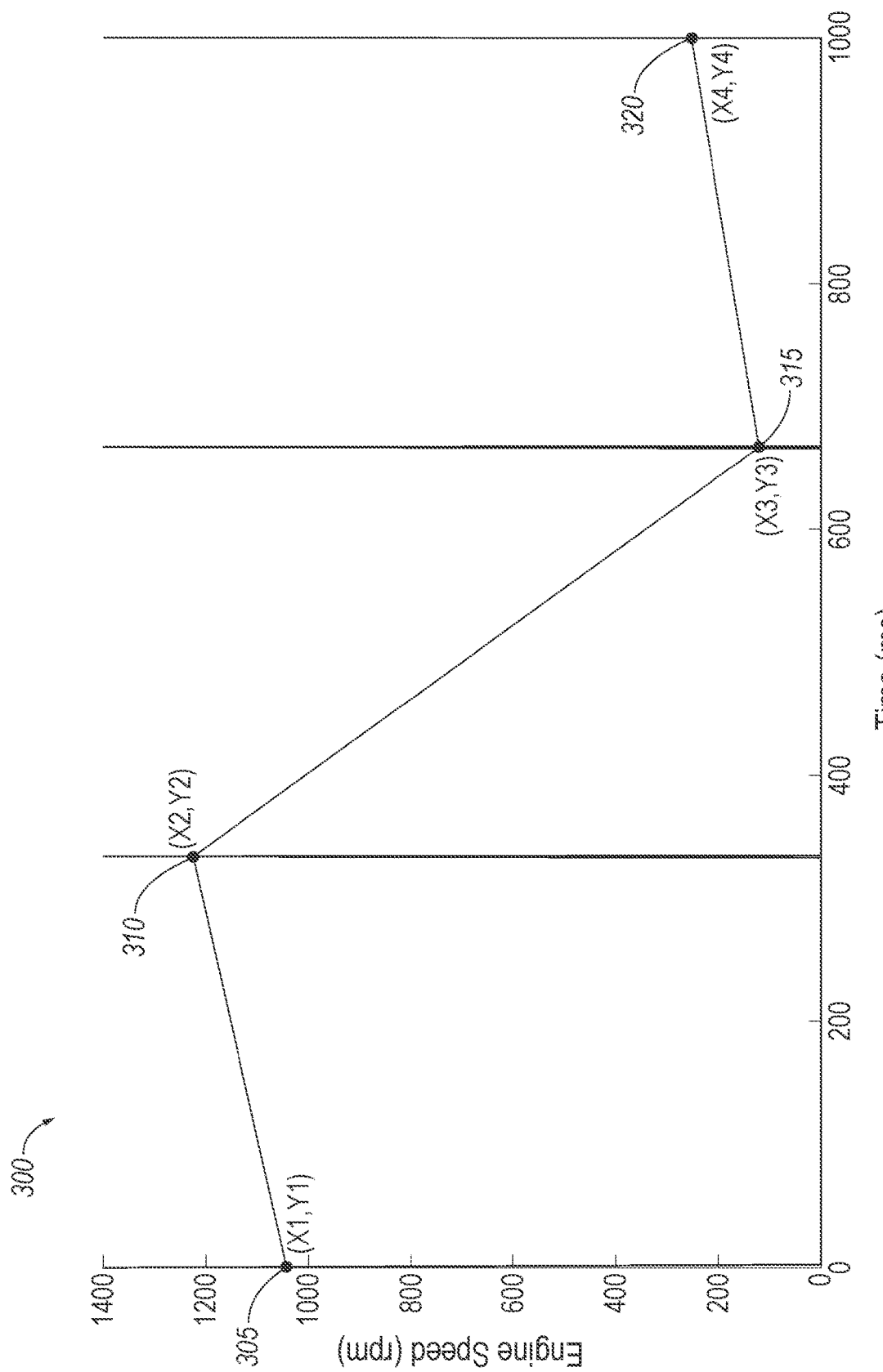
FIG. 3 is a diagram of example data points and slopes between the data points.

FIG. 3 is a chart 300 of four example data points 305, 310, 315, 320. The data points 305-320 are raw data 200 or sample data 210 collected by the sensor 115, and each data point 305-320 has respective (x,y) values. In the example of FIG. 3, the x axis is time in milliseconds (ms), and the y axis is engine speed in revolutions per minute (rpm). Each data point 305, 310, 315, 320 is thus a single engine speed value evaluated at a single time. The data point 305 is represented as $(x_1,y_1)$, the data point 310 is represented as $(x_2,y_2)$, the data point 315 is represented as $(x_3,y_3)$, and the data point 320 is represented as $(x_4,y_4)$.

The computer 110 can determine the cubic spline for each data point 305-320 based on slopes at each data point 305. For example, for the data point 310, the slope $M_2$ can be determined based on the following Expressions:

$$M_2 = \tan\left(\frac{L_{12}^2}{L_{12}^2 + L_{23}^2} \cdot \operatorname{atan} m_{12} + \frac{L_{23}^2}{L_{12}^2 + L_{23}^2} \cdot \operatorname{atan} m_{23}\right) \quad (1)$$

$$m_{12} = \frac{y_2 - y_1}{x_2 - x_1}; m_{23} = \frac{y_3 - y_2}{x_3 - x_2} \quad (2)$$

$$L_{12} = \sqrt{(y_2 - y_1)^2 + (x_2 - x_1)^2} \quad (3)$$

$$L_{23} = \sqrt{(y_3 - y_2)^2 + (x_3 - x_2)^2} \quad (4)$$

where tan( ) is the tangent function, atan( ) is the arctangent function (i.e., the function inverse of the tangent function), $M_2$ is the slope at the data point 310, $L_{12}$ is the Euclidean distance between the data points 305, 310, $L_{23}$ is the Euclidean distance between the data points 310, 315, $m_{12}$ is the linear slope between the data points 305, 310, and $m_{23}$ is the linear slope between the data points 310, 315.

To approximate data between the data points 305-320, the computer 110 can determine the cubic spline, as described above, as a cubic equation of the form $ax^3+bx^2+cx+d$. The computer 110 can determine the coefficients a, b, c, d by solving a matrix equation, as shown in the Expression below:

$$\begin{bmatrix} 1 & x_1 & x_2 & x_3 \\ 1 & x_2 & x_3 & x_4 \\ 0 & M_1 & M_2 & M_3 \\ 0 & M_2 & M_3 & M_4 \end{bmatrix} \backslash \begin{bmatrix} y_1 \\ y_2 \\ M_1 \\ M_4 \end{bmatrix} = [d \; c \; b \; a] \quad (5)$$

where "\" is the left matrix division operation (as defined and used in Matlab and GNU Octave, for example), the x,y values are the data points 305-320 listed above, and $M_1$, $M_2$, $M_3$, $M_4$ are the slopes at the data points 305-320, as described above. Alternatively, the computer 110 can determine the coefficients a, b, c, d by taking the inverse of the 4×4 matrix in the above Expression using a different technique, e.g., Gauss-Jordan elimination, the adjoint method, the partition method, etc. for each set of four data points 305, 310, 315, 320 in the sampled data 210 stored in the memory.

FIG. 4 is a diagram of a memory space 400 in the memory of the computer 110. The memory space 400 stores data collected by the sensors 115 and/or components 120, as described above. The memory space 400 includes a plurality of subspaces 405, each subspace 405 including a specified number of bits to store the data. For example, the subspace 405 can include 16 bits and can store a single 16-bit number or two 8-bit numbers. The example memory space 400 of FIG. 4 includes one 16-bit subspace 405 and 22 8-bit subspaces 405. Thus, without compressing the raw data 200, the memory space 400 can store 12 data points of the raw data 200 or the sampled data 210, each data point being a 16-bit number.

The computer 110 can store all of the raw data 200 or the sampled subset 210 of the raw data 200 in the memory space 400. Each data point of the raw data 200 can be a 16-bit number, e.g., a floating point number, a signed integer, etc. As stated above, the memory space 400 can include one 16-bit subspace 405 and 22 8-bit subspaces 405. To compress the 16-bit data points of the raw data 200 to fit into the 8-bit subspaces 405, the computer 110 can determine a difference between consecutive pairs of data points and store the difference as an 8-bit number in each 8-bit subspace 405. For example, the computer 110 can store a first data point as a 16-bit number in a 16-bit subspace 405. The computer 110 can then store a difference between the first data point and a second data point as an 8-bit number in an 8-bit subspace 405. The computer 110 can then store a difference between the second data point and a third data point as an 8-bit number in another 8-bit subspace 405. The computer 110 can continue to fill the 8-bit subspaces 405 with 8-bit differences of consecutive data points, storing 23 data points in a memory space 400 that would typically store only 12 data points of raw data 200.

Determining the difference between consecutive 16-bit data points as an 8-bit number can introduce rounding errors as the final 8 bits of precision are lost when converting from the 16-bit number to the 8-bit number. To reduce the rounding errors, the computer 110 can store each difference as an 8-bit signed integer that is determined based on a square root of the difference between the pair of data points. That is, for first and second data points $p_1$, $p_2$, the computer 110 can determine the stored difference D as:

$$D_{o102}=\text{sgn}(p_1-p_2)\sqrt{|p_1-p_2|} \quad (6)$$

$$D_i=\text{sgn}(p_i-p_{i+1})\sqrt{|p_i-p_{i+1}|} \quad (7)$$

where sgn is the signum function that outputs the sign of the difference $p_1-p_2$ (i.e., 1 for positive and −1 for negative) and $|p_1-p_2|$ is the absolute value of the difference $p_1-p_2$. Taking the absolute value of the difference and multiplying by the signum function prevents the square root function from taking a square root of a negative number (undefined in real numbers) while preserving the sign of the difference. $D_i$ is the difference between the ith data point and the (i+1)th data point. Taking the square root of the difference $p_1-p_2$ as a 16-bit number and then rounding to an 8-bit number reduces the rounding error because the rounding loss of a square root of a number is smaller than the rounding loss of the number itself. The computer 110 can store the stored difference D for each consecutive pair of data points for a specified set of data points to be stored in the memory space 400. For example, the 22 8-bit subspaces can store 22 differences, and in addition to the first data point stored in the 16-bit subspace 405, the memory space 400 can store 23 data points in a memory space 400 that would typically store only 12 data points of raw data 200.

To further reduce rounding errors, the computer 110 can store the difference D as a signed 8-bit integer instead of an 8-bit floating point number. A signed floating point number uses one bit for the sign of the number, one or more bits for an exponent value, and the remaining bits for the number to multiply by the exponent value. That is, the one or more bits used for the exponent value cannot be used for the value of the data point, reducing the number of bits (and thus the precision) of the compressed data point. By compressing the data point to an 8-bit signed integer, which does not use any bits for an exponent value, the computer 110 can use 7 of the 8 bits for values of the difference D, improving precision of the compression from the 16-bit data point to the 8-bit difference D. To determine the 8-bit integer, the computer 110 can determine a scaling factor SF for a set of data points, multiply each difference $D_i$ by the scaling factor SF, and round each scaled difference to an 8-bit signed integer:

$$D_{max} = \max_i |D_i| \quad (8)$$

$$SF = \left\lfloor \frac{127}{D_{max}} \right\rfloor \quad (9)$$

where $D_{max}$ is the maximum absolute value of the difference $D_i$ and $\lfloor x \rfloor$ is the floor function that outputs the integer part of the input number. The scaling factor SF is rounded to unsigned 8-bit integer. The computer 110 can multiply each difference $D_i$ by the scaling factor SF to generate a scaled difference $SD_i$ as a signed 8-bit integer. The computer 110 can then store each scaled difference $SD_i$ in respective ones of the 8-bit subspaces 405, and the scaling factor SF in the last 8-bit subspace. Thus, the computer 110 can store one raw data point as a 16-bit integer, 21 data points as 8-bit signed integers, and the scaling factor SF as an 8-bit unsigned integers, storing 22 data points in a memory space 400 that would typically store only 12 data points of raw data 200.

To restore the data, the computer 110 can retrieve the first raw data point from the 16-bit subspace 405 and the scaling factor SF from its subspace 405. Then, the computer 110 can retrieve the first scaled difference $SD_{o102}$, multiply the scaled difference by the scaling factor SF and its absolute value, and add the multiplied scaled difference to the first raw data point. For the second data point, the Expression below shows the calculation:

$$p_2=p_1+SF \cdot SD_{o102} \cdot |SD_{o102}| \quad (10)$$

That is, the scaled difference $SD_i$ preserves the sign of the original data point $p_2$ and is the square root of the difference between the data points $p_2-p_1$ scaled by the scaling factor. The restored point $p_2$ is a 16-bit signed integer.

Figure 5:
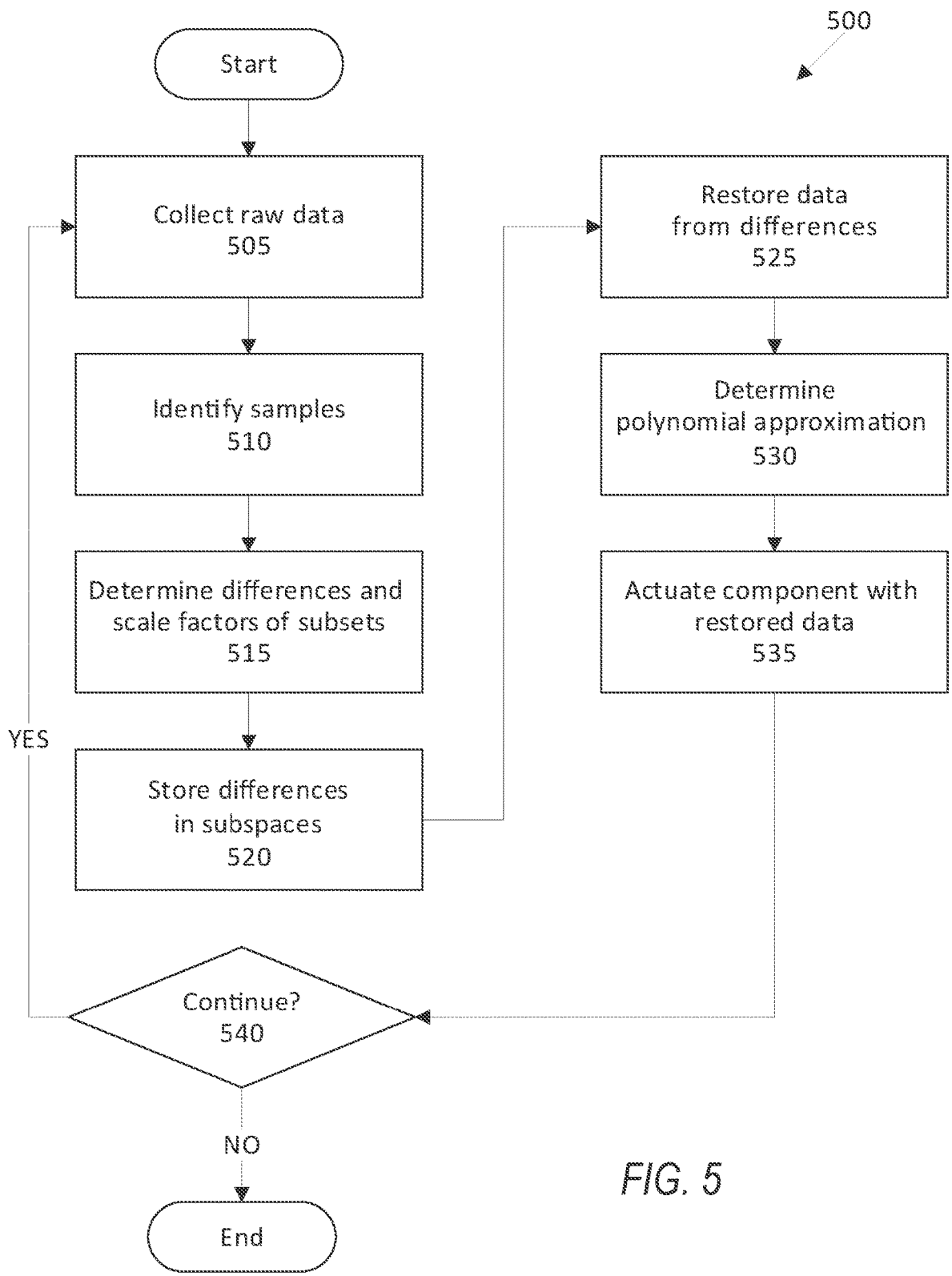
FIG. 5 is a block diagram of an example process for compressing and restoring data collected in the vehicle.

FIG. 5 is a block diagram of an example process 500 for compressing data collected in a vehicle 105. The process 500 begins in a block 505, in which a computer 110 of the vehicle 105 collects raw data 200 from a sensor 115. The computer 110 can collect the raw data 200 from the network 125. The raw data 200 can be, e.g., engine speed data, fuel level data, etc., just to name a few possible examples.

Next, in a block 510, the computer 110 identifies samples 210 of the raw data 200. Because the memory of the computer 110 may not have enough space to store all of the raw data 200, the computer 110 can store a portion of the raw data 200 as sampled data 210. The computer 110 can identify the sampled data 210 as evenly-spaced data points of the raw data 200. The computer 110 can identify a first data point of the raw data 200 and then identify each data point that is a specified number of data points from the first data point as the sample data 210. For example, for a set of 10,000 data points of raw data 200, the computer 110 can identify a first data point having an index "0" and then identify a second data point that is 20 data points after the first data point, i.e., having an index "20." The computer 110 can then identify each data point having an index that is 20 values after the previously identified data point, i.e., with indexes "40," "60," etc., and store the identified data points as the sampled data 210. That is, the computer 110 can store data points having respective indexes congruent to 0 modulo 20 as the sampled data 210, reducing the 10,000 collected data points to 500 stored sample data points 210.

Next, in a block 515, the computer 110 determines a plurality of subsets of the sampled data 210 and identifies respective differences between the sampled data points 210 in each subset. As described above, the computer 110 can determine sets of 22 consecutive sampled data points 210 and determine the square root of the difference between each consecutive pair of data points. These square root differences can be 16-bit floating point numbers. The computer 110 can then scale the square root differences to 8-bit signed integers by a scaling factor SF. Scaling the 16-bit floating point number square root differences to 8-bit signed integers reduces the amount of memory space used to store the square root differences while preserving precision of the 16-bit number in 8 bits of space.

Next, in a block 520, the computer 110 stores the differences in a memory space 400. As described above, the memory space 400 can include a plurality of 8-bit subspaces 405, and the computer 110 can store each 8-bit integer difference in one of the 8-bit subspaces 405. The computer 110 can store the scaling factor SF in one of the 8-bit subspaces and a first sampled data point 210 in a 16-bit memory subspace 405. Thus, the computer 110 can store 22 8-bit differences in a memory space 400 that has 12 16-bit subspaces 405 (that are further subdivided into 8-bit subspaces 405), compressing data from 22 data points 210 into a memory space 400 that would typically store 12 data points 210. That is, 22 data points can be encoded in 12 16-bit words of memory.

Next, in a block 525, the computer 110 restores the sampled data points 210 from the memory spaces 400. As described above, the computer 110 can restore the sampled data points 210 by retrieving the first data point from the first memory subspace 405, adding the difference in the next memory subspace 405 to restore a second data point, and adding successive differences from successive memory spaces 405 until all 22 sampled data points 210 are restored.

Next, in a block 530, the computer 110 determines a polynomial approximation 205 between the sampled data points 210 to restore data approximating the raw data 200. As described above, the computer 110 can determine a cubic polynomial approximation 205 (e.g., a cubic Hermite spline) based on determined slopes between the sampled data points 210. For example, for four data points 305, 310, 315, 320, the computer 110 can determine a cubic equation $ax^3+bx^2+cx+d$ based on slopes $M_1$, $M_2$, $M_3$, $M_4$ of the data points 305, 310, 315, 320. The computer 110 can determine the polynomial approximation 205 as the sum of the cubic splines for each set of four data points 305-320. In the process 500, the computer 110 can determine the polynomial approximation 205 after restoring the sampled data 210 from the memory spaces 400. Alternatively, the computer 110 can determine the polynomial approximation 205 before compressing the sampled data points 210 and store the polynomial approximation in the memory, i.e., after the block 510 but before the block 515 in the example process 500.

Next, in a block 535, the computer 110 actuates one or more vehicle components 120 based on the restored data points 210 and the polynomial approximation 205. For example, the computer 110 can restore fuel consumption data and use the restored fuel consumption data to determine a fuel consumption rate of a propulsion for a previously traveled trip. The computer 110 can then predict a fuel consumption rate for a future trip and actuate at least one of a fuel injector, a spark plug, an exhaust gas recirculation subsystem, and/or throttle based on the predicted fuel consumption rate.

Next, in a block 540, the computer 110 determines whether to continue the process 500. For example, the computer 110 can determine not to continue the process 500 when the vehicle 105 is powered off. If the computer 110 determines to continue, the process 500 returns to the block 505. Otherwise, the process 500 ends.

Computing devices discussed herein, including the computer 110, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 110 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 500, one or more of the steps could be omitted, or the steps could be executed in a different order than shown in FIG. 5. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

Ordinal adjectives such as "first" and "second" are used throughout this document as identifiers and are not intended to signify importance or order.

The invention claimed is:

1. A system, comprising a computer including a processor and a memory, the memory storing instructions executable by the processor to:

determine a plurality of sets of sample data points collected from a vehicle sensor, each set including a predetermined number of consecutive sample data points;

determine respective differences between pairs of consecutive sample data points in each set;

store the differences in respective subspaces of one of a plurality of memory spaces of the memory, each memory space in the plurality of memory spaces storing differences of one and only one of the plurality of sets of sample data points;

restore the collected data based on the stored differences in the plurality of memory spaces; and actuate a vehicle component based on the restored data.

2. The system of claim 1, wherein the collected data are engine speed data, and the instructions further include instructions to actuate a vehicle propulsion based on restored engine speed data.

3. The system of claim 1, wherein a memory size of each memory space is smaller than a combined memory size of the set of sample data points associated to the respective memory space.

4. The system of claim 1, wherein the memory space is a plurality of 16-bit data blocks, and each 16-bit data block includes two of the differences stored as an 8-bit number.

5. The system of claim 1, wherein the instructions further include instructions to generate a polynomial interpolation based on the plurality of sample data points and to restore the collected data based on the polynomial interpolation and the stored differences.

6. The system of claim 5, wherein the polynomial interpolation is a cubic spline.

7. The system of claim 5, wherein the instructions further include instructions to actuate the vehicle component based on a restored data point between two consecutive sample data points, the restored data point based on the polynomial interpolation between the two consecutive sample data points.

8. The system of claim 1, wherein the instructions further include instructions to determine a respective slope between each pair of consecutive sample data points in each set and to restore the sample data points based on the determined slopes.

9. The system of claim 1, wherein each set of the sample data points includes sample data points within a specified period of time.

10. The system of claim 1, wherein the instructions further include instructions to, for each memory space, determine a scaling factor to convert each determined difference from a floating point number to an integer and to store the scaling factor as a segment in the memory space.

11. The system of claim 10, wherein the scaling factor is based on a magnitude of one of the differences in the memory space.

12. The system of claim 10, wherein the instructions to restore the sample data points further include instructions to divide each difference in the memory space by the scaling factor.

13. The system of claim 1, wherein the memory space includes a first sample data point of the set of sample data points associated to the memory space, and the instructions to restore the collected data include instructions to sum the first sample data point with at least one of the stored differences.

14. A method, comprising:
determining a plurality of sets of sample data points collected from a vehicle sensor, each set including a predetermined number of consecutive sample data points;
determining respective differences between pairs of consecutive sample data points in each set;
storing the differences in respective subspaces of one of a plurality of memory spaces of the memory, each memory space in the plurality of memory spaces storing differences of one and only one of the plurality of sets of sample data points;
restoring the collected data based on the stored differences in the plurality of memory spaces; and
actuating a vehicle component based on the restored data.

15. The method of claim 14, wherein the collected data are engine speed data, and the method further comprises actuating a propulsion based on restored engine speed data.

16. The method of claim 14, wherein the memory space is a plurality of 16-bit data blocks, and each 16-bit data block includes two differences, each difference stored as an 8-bit number.

17. The method of claim 14, further comprising generating a polynomial interpolation based on the plurality of sample data points and restoring the collected data based on the polynomial interpolation and the stored differences.

18. The method of claim 14, further comprising determining a respective slope between each pair of consecutive sample data points in each set and restoring the sample data points based on the determined slopes.

19. The method of claim 14, wherein each set of the sample data points includes sample data points within a specified period of time.

20. The method of claim 14, wherein the memory space includes a first sample data point of the set of sample data points associated to the memory space, and the method further comprises summing the first sample data point with at least one of the stored differences.

* * * * *